United States Patent [19]
Kline

[11] 3,838,970
[45] Oct. 1, 1974

[54] CENTRIFUGE TUBE FOR ULTRA-VIOLET ANALYSIS

[75] Inventor: William M. Kline, Gloversville, N.Y.

[73] Assignee: Medical Evaluation Devices & Instruments Corp., Gloversville, N.Y.

[22] Filed: May 23, 1973

[21] Appl. No.: 362,906

Related U.S. Application Data

[62] Division of Ser. No. 207,192, Dec. 13, 1971, Pat. No. 3,752,146.

[52] U.S. Cl. ............... 23/230 B, 23/230 R, 23/259, 250/227
[51] Int. Cl. ...................... G01n 33/16, G01n 21/34
[58] Field of Search.......... 23/230 R, 230 B, 230 M, 23/253 R, 259; 356/96 R, 96 B; 250/227; 233/1

[56] References Cited
UNITED STATES PATENTS

| | | | |
|---|---|---|---|
| 2,542,456 | 2/1951 | Ayres | 250/227 X |
| 2,964,993 | 12/1960 | Witt | 250/227 X |
| 3,727,066 | 4/1973 | Louderback | 250/227 X |
| 3,790,791 | 2/1974 | Anderson | 250/227 |

*Primary Examiner*—R. E. Serwin
*Attorney, Agent, or Firm*—Thomas E. Tate

[57] ABSTRACT

A centrifuge tube formed from a transparent plastic and provided at its bottom with a penetratable membrane through which an optical fiber element is passed upon completion of centrifuging of the contents to enable visual observation of the effect of light, particularly ultra-violet light, on the contents, when compared with a standard or control, to detect the presence or absence of a predetermined type of foreign matter in the centrifuged contents of the tube. The optical fiber element may be formed from quartz or from such a material as a methyl methacrylate capable of transmitting ultra-violet light.

5 Claims, 3 Drawing Figures

PATENTED OCT 1 1974  3,838,970

CENTRIFUGE TUBE FOR ULTRA-VIOLET ANALYSIS

This invention is a division of my copending application Ser. No. 207,192, filed Dec. 13, 1971, and now U.S. Pat. No. 3,752,146, and is an improvement over that disclosed and claimed in my copending application Ser. No. 60,354, filed Aug. 3, 1970, now U.S. Pat. No. 3,712,295, for "Centrifuge Tube" and also is an improvement over that disclosed and claimed in my continuation-in-part copending application Ser. No. 207,447 filed Dec. 13, 1971, now U.S. Pat. No. 3,796,542, for "Multipurpose Centrifuge Tube."

This invention relates to new and useful improvements in laboratory equipment and particularly seeks to provide a novel molded centrifuge tube formed from that type of plastic that is transparent upon completion of molding so that the contents of the tube, during use thereof, may be subjected to ultra-violet light analysis without having to be transferred to a separate container or receiving slide.

In certain diagnostic procedures, such as the PAP test for cancer of the cervix, the area to be tested generally is irrigated with a pre-or post-dyed saline or other solution which is then withdrawn and centrifuged to separate the solids for subsequent reagent or other analysis. Such an analysis may include subjecting the dyed specimen solids to exposure to ultra-violet light to visually indicate the qualitative presence or absence of cytological and histo-chemical abnormalities in the specimen by color changes as compared to a control. Obviously the dyes are selected to be effective for the precise type of ulta-violet indication required. That is to say, one dye or a class of dyes may give an ultra-violet response to cancerous matter, for example, while another dye or class of dyes may give an ultra-violet response to another type of detectable matter in the specimen.

A centrifuge tube constructed in accordance with this invention enables such procedures to be greatly simplified in that the same tube may be used to collect the specimen, centrifuge the specimen and subject the specimen to ultra-violet light analysis without having to transfer any portion of the centrifuged specimen to a slide or other external receiver.

The effectiveness of the centrifuge tube of this invention stems from the fact that it is transparent and is provided at its bottom with a membrane closure that can be penetrated by a sharp ended optical fiber element that is capable of transmitting ultra-violet light from an external source into the bottom portion of the tube upon completion of centrifuging.

Such an optical fiber element may be formed from quartz or from any other material capable of transmitting ultra-violet light, such as a methyl methacrylate of the type commerically available from Imperial Chemical Industries under the Trademark DIAKON, or its equivalent.

Therefore, an object of this invention is to provide a transparent centrifuge tube formed from a smooth, inert, flexible plastic having a memory, and having a syringe tip at its top and a sealed bottom that is penetrable by a sharp ended optical fiber element capable of transmitting ultra-violet light to the interior of said tube.

Another object of this invention is to provide a centrifuge tube of the character stated in which the body is formed as a bellows-folded helix to direct the flow of solid particles to the bottom when centrifuged.

Another object of this invention is to provide a centrifuge tube of the character stated in which said optical fiber element is in the form of a double tipped hollow needle to enable said tube to be used as a positive acting syringe to discharge the concentrated solids for subsequent examination following completion of centrifuging and ultra-violet light analysis of the contents.

A further object of this invention is to provide a centrifuge tube of the character stated in which the sealed bottom is tapered by two diametrically opposed concave hollows that may serve as abutments for the positioning of the tube in a centrifuge and/or as abutments for the mechanical axial partial collapsing of the tube in subsequently used processing apparatus.

A further object of this invention is to provide a centrifuge tube of the character stated that is simple in design, rugged in construction and economical to manufacture.

With these and other objects, the nature of which will be apparent, the invention will be more fully understood by reference to the drawings, the accompanying detailed description and the appended claims.

Figure 1:
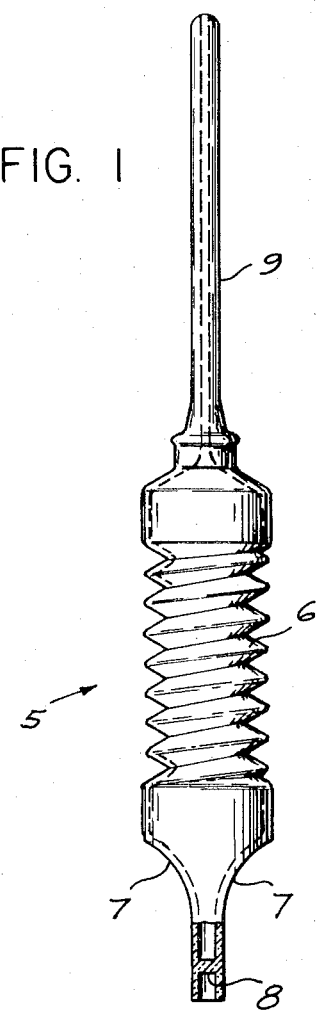
FIG. 1 is a side elevation of a centrifuge tube constructed in accordance with this invention.
Figure 2:
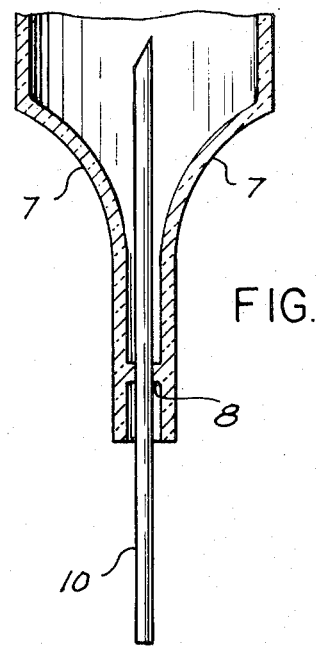
FIG. 2 is a fragmentary section of the bottom thereof showing the insertion of a sharp ended optical fiber element through the bottom for ultra-violet light analysis of the centrifuged contents.

Referring to the drawings in detail the invention, as illustrated, is embodied in a transparent centrifuge tube generally indicated 5 formed from an inert molded plastic such as a polyethylene, polypropylene or polyurethane having a memory and having the characteristic of transparency when molded into a finished object and includes a hollow body 6 formed as a helix, of say, four to sixteen turns from top to bottom.

The bottom is tapered as at 7,7 by two diametrically opposed concave hollows that may serve as abutments for positioning the tube in a centrifuge and/or as abutments for the mechanical axial partial collapsing of the tube to discharge a portion of its contents into subsequently used processing apparatus. The bottom is closed by a membrane 8 and the top is provided with an axially extending hollow tip or cannula 9 that extends into open communication with the interior of the body 6 and is, of course, sufficiently long to reach that portion of a patient's body cavity from which a specimen is to be collected. The tip 9 may be covered by a friction cap (not shown) or other suitable closure to maintain same sterile until use, it being understood that the interior of the body 6 is already sterile due to its exposure to heat above sterilizing temperatures during formation of the tube.

In preparation for use in diagnostic tests, such as the above mentioned PAP test, the body 6 is filled with an ultra-violet responsive dyed solution by immersing the tip 9 in a supply thereof and axially collapsing and releasing the body 6 to draw in a quantity of the solution by vacuum, after which the tip is closed.

At the point of use, the tip is uncovered and inserted into the proper body cavity which becomes irrigated as the result of using the body 6 as a positive and negative acting syringe, thus collecting the required specimen for examination. After the specimen has been collected the tube and its contents are transferred to a centrifuge where the solids are concentrated adjacent the bottom 8. The helices of the body 6 expedite the flow of solids toward the bottom during centrifuging or vortex mixing, thus assuring proper concentration of the solids in a substantially uniform distribution.

At this stage, ultra-violet light analysis of the concentrated solids may be readily effected without having to discharge any part thereof onto a slide or other receiver, simply by piercing the bottom membrane 8 with a sharp ended fiber optic element or rod 10, capable of transmitting ultra-violet light, so that its inner end is contained within the concentrated solids in the bottom of the tube and its outer end is exposed for operable connection to an external source of ultra-violet light which is transmitted to the solids via the rod 10. The transparency of the tube makes it readily possible to observe any ultra-violet effect on the contents of the tube and to visually compare that effect with an ultra-violet control or standard to determine, qualitatively, the presence or absence of cytological or histochemical abnormalities in the specimen.

Figure 3:
FIG. 3 is a detail elevation, partly in section, showing a modified form of optical fiber element to permit the tube to be used as a syringe for discharge of at least a portion of the contents.

If further testing of the concentrated solids is required beyond that obtained by ultra-violet light analysis as described above, the solid fiber optic element 10 would be replaced by a hollow double-ended needle element 11 (see FIG. 3) so that the centrifuge tube 5 also could be used as a positive acting syringe to discharge a portion of the specimen onto a slide or other receiver as an incident to such further testing.

It is of course to be understood that variations in arrangements, changes in materials and proportions of parts may be made within the scope of the appended claims.

I claim:

1. In a method of visually analyzing an organic specimen through exposure to transmitted light, the steps of; supplying a transparent centrifuge tube having a penetrable membrane at that end thereof where solids are concentrated following completion of centrifuging, at least partly filling said centrifuge tube with a liquid containing a dispersion of the solids of said organic specimen, centrifuging said liquid dispersion to concentrate the solids thereof at the membrane-containing end of said centrifuge tube, then inserting an optical fiber element through said penetrable membrane so that its inner end is contained within the concentrated solids in said tube and its outer end is exposed for operable connection to an external source of light, then operably connecting the said outer exposed end of said optical fiber element to said external source of light whereby to transmit light from said external source into the concentrated solids within said tube, and visually observing any effect created by the light transmitted through said optical fiber element upon the concentrated solids of said specimen.

2. The method of claim 1 in which said centrifuge tube is formed as a syringe for the direct collection of said specimen from a body cavity of an animate being.

3. The method of claim 1 in which said liquid dispersion of said organic specimen is dyed, at least prior to centrifuging, with a dye that, under ultra-violet light, exhibits a color response to indicate the presence or absence of predetermined foreign matter in said specimen as compared with that of a dye control standardized for the presence or absence of the same foreign matter, and in which said optical fiber element is formed from a material capable of transmitting ultra-violet light.

4. The method of claim 3 in which said optical fiber element is formed from the group of materials consisting of quartz and a methyl methacrylate capable of transmitting ultra-violet light.

5. The method of claim 3 in which the light transmitted through said optical fiber element is ultra-violet light.

* * * * *